United States Patent
Graham et al.

(10) Patent No.: US 9,317,317 B2
(45) Date of Patent: Apr. 19, 2016

(54) IMPLEMENTING CONCURRENT DEVICE DRIVER MAINTENANCE AND RECOVERY FOR AN SRIOV ADAPTER IN A VIRTUALIZED SYSTEM

(71) Applicant: International Business Machines Corporation, Armonk, NY (US)

(72) Inventors: Charles S. Graham, Rochester, MN (US); John R. Oberly, III, Rochester, MN (US); Timothy J. Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 13/915,737

(22) Filed: Jun. 12, 2013

(65) Prior Publication Data

US 2014/0372794 A1 Dec. 18, 2014

(51) Int. Cl.
G06F 9/00 (2006.01)
G06F 9/455 (2006.01)
G06F 9/50 (2006.01)

(52) U.S. Cl.
CPC ........ *G06F 9/45558* (2013.01); *G06F 9/45533* (2013.01); *G06F 9/5077* (2013.01); *G06F 2009/45575* (2013.01); *G06F 2009/45579* (2013.01)

(58) Field of Classification Search
CPC .............. G06F 11/142; G06F 11/1433; G06F 11/1438; G06F 11/1471; G06F 11/1484; G06F 11/0712; G06F 11/0793; G06F 9/455; G06F 9/45558; G06F 9/45533; G06F 9/5077; G06F 2009/45558; G06F 2009/45575; G06F 2009/45579; G06F 2009/45591; G06F 8/65; G06F 8/67

USPC ........................................................ 714/5.1
See application file for complete search history.

(56) References Cited

U.S. PATENT DOCUMENTS 5,875,310 A 2/1999 Buckland et al.
6,122,289 A 9/2000 Brown et al.
(Continued)

FOREIGN PATENT DOCUMENTS

EP 1130501 A1 9/2001

OTHER PUBLICATIONS

Bhosale, Shivaji D. et al., "IBM Power Systems SR-IOV Technical Overview and Introduction", REDP-5065-00, International Business Machines Corporation, May 20, 2014, pp. 1-71.
Ko, Mike et al., "Virtual Ethernet Bridging", International Business Machines Corporation, Jul. 2008, pp. 1-11.
Power 7 Information, Virtualizing Power Systems Servers, International Business Machines Corporation, Apr. 29, 2014.
Emulex, "Single Root I/O Virtualization (SR-IOV)", Version 3.1 User's Guide, P007978-01A Rev. A, 2012, pp. 1-5.
(Continued)

*Primary Examiner* — Bryce Bonzo
*Assistant Examiner* — Anthony J Amoroso
(74) *Attorney, Agent, or Firm* — Joan Pennington

(57) ABSTRACT

A method, system and computer program product are provided for implementing concurrent adapter driver maintenance and recovery for a Single Root Input/Output Virtualization (SRIOV) adapter in a computer system. An adapter driver at start up time performs configuration of the adapter and each of a set of virtual functions (VFs). The adapter driver writes critical adapter and VF configuration data to a scratchpad buffer. When device driver maintenance is needed, such as to load updated adapter driver firmware, all VF drivers are held off temporarily, current adapter driver is detached, and then the adapter driver is reloaded with the updated driver firmware. Then the adapter driver is restarted with the updated adapter driver firmware, and performs a reinitialization process. The adapter driver performs adapter and VF configuration restoring existing configuration using values read from the scratchpad buffer.

20 Claims, 5 Drawing Sheets

(56) References Cited

U.S. PATENT DOCUMENTS

| | | |
|---|---|---|
| 6,311,326 B1 | 10/2001 | Shagam |
| 7,231,493 B2 | 6/2007 | Nguyen et al. |
| 7,757,129 B2 | 7/2010 | Bohizic et al. |
| 7,770,073 B2 | 8/2010 | Fashchik et al. |
| 8,141,092 B2 * | 3/2012 | Brown et al. ............ 718/104 |
| 8,261,242 B2 | 9/2012 | Booth et al. |
| 8,358,661 B2 | 1/2013 | Armstrong et al. |
| 8,359,415 B2 | 1/2013 | Brown et al. |
| 8,375,363 B2 | 2/2013 | Zhou et al. |
| 8,418,166 B2 | 4/2013 | Armstrong et al. |
| 8,447,891 B2 | 5/2013 | Brownlow et al. |
| 9,135,101 B2 | 9/2015 | Prabhakraran et al. |
| 2002/0161907 A1 | 10/2002 | Moon |
| 2003/0037275 A1 | 2/2003 | Bakke et al. |
| 2004/0019670 A1 | 1/2004 | Viswanath |
| 2004/0049710 A1 | 3/2004 | Ashmore et al. |
| 2004/0260981 A1 | 12/2004 | Kitamorn et al. |
| 2008/0147904 A1 * | 6/2008 | Freimuth et al. ............ 710/22 |
| 2009/0133028 A1 | 5/2009 | Brown et al. |
| 2009/0144731 A1 | 6/2009 | Brown et al. |
| 2009/0178033 A1 | 7/2009 | Challener et al. |
| 2009/0313391 A1 | 12/2009 | Watanabe |
| 2010/0115049 A1 | 5/2010 | Matsunaga et al. |
| 2010/0146170 A1 | 6/2010 | Brown et al. |
| 2011/0040860 A1 | 2/2011 | DuCusatis et al. |
| 2012/0102490 A1 | 4/2012 | Eide et al. |
| 2012/0124572 A1 | 5/2012 | Cunningham et al. |
| 2012/0137288 A1 | 5/2012 | Barrett et al. |
| 2012/0151472 A1 | 6/2012 | Koch et al. |
| 2012/0159245 A1 | 6/2012 | Brownlow et al. |
| 2012/0179932 A1 | 7/2012 | Armstrong et al. |
| 2012/0180047 A1 | 7/2012 | Cardona et al. |
| 2012/0180048 A1 | 7/2012 | Brownlow et al. |
| 2012/0185632 A1 | 7/2012 | Lais et al. |
| 2012/0246644 A1 | 9/2012 | Hattori et al. |
| 2012/0254862 A1 | 10/2012 | Dong et al. |
| 2012/0297379 A1 | 11/2012 | Anderson et al. |
| 2012/0317548 A1 | 12/2012 | Olsa et al. |
| 2013/0054507 A1 | 2/2013 | Das et al. |
| 2013/0275972 A1 | 10/2013 | Sawa et al. |
| 2014/0250338 A1 | 9/2014 | Prabhakaran et al. |

OTHER PUBLICATIONS

Varma, Anujan, "Single Root IOV Endpoint Implementation", PCI-SIG Developers Conference 2007, PCI-SIG, May 21, 2007, pp. 1-36.
International Search Report and Written Opinion of the ISA dated Jul. 8, 2014—International Application No. PCT/JP2014/002914.
Netronome; "Standardized but Flexible I/O for Self-Virtualizing Devices"; WTOV'08 Proceedings of the First Conference on I/O Virtualization; p. 9-9; 2008.
Broadcom; "Broadcom Ethernet Network Controller Enhanced Virtualization Functionality"; http://www.broadcom.com/press/release.php?id=1197764; White Paper; Oct. 2009.
Challa, NR.; "Hardware Based I/O Virtualization Technologies for Hypervisors, Configurations, and Advantages—A Study"; Proceedings of the 2012 IEEE International Conference on Cloud Computing in Emerging Markets (CCEM), 5 pp.; IEEE; 2012.
Charles S. Graham et al. U.S. Appl. No. 13/915,887, filed on the same day herewith, entitled "Implementing Distributed Debug Data Collection and Analysis for a Shared Adapter in a Virtualized System".
Gary D. Anderson et al. U.S. Appl. No. 13/915,903, filed on the same day herewith, entitled "Implementing Capacity and User-Based Resource Allocation for a Shared Adapter in a Virtualized System".
Jesse P. Arroyo et al. U.S. Appl. No. 13/915,943, filed on the same day herewith, entitled "Implementing Enhanced Error Handling of a Shared Adapter in a Virtualized System".
Charles S. Graham et al. U.S. Appl. No. 13/915,966, filed on the same day herewith, entitled "Implementing Shared Adapter Configuration Updates Concurrent With Maintenance Actions in a Virtualized System".
Jesse P. Arroyo et al. U.S. Appl. No. 13/916,005, filed on the same day herewith, entitled "Implementing Concurrent Adapter Firmware Update of an SRIOV Adapter in a Virtualized System".
Kirk Glerum et al., "Debugging in the (Very) Large: Ten Years of Implementation and Experience", Microsoft Corporation, 2009.
Nithya Ramanathan et al., "Sympathy for the Sensor Network Debugger", UCLA Center for Embedded Network Sensing, 2005.

* cited by examiner

IMPLEMENTING CONCURRENT DEVICE DRIVER MAINTENANCE AND RECOVERY FOR AN SRIOV ADAPTER IN A VIRTUALIZED SYSTEM

FIELD OF THE INVENTION

The present invention relates generally to the data processing field, and more particularly, relates to a method, system and computer program product for implementing concurrent adapter driver maintenance and recovery for a Single Root Input/Output Virtualization (SRIOV) adapter in a virtualized system.

DESCRIPTION OF THE RELATED ART

Single root input/output (IO) virtualization (SRIOV) is a PCI standard, providing an adapter technology building block for 110 virtualization within the PCI-Express (PCIe) industry. SRIOV capability is a feature of many new PCIe adapters for Fibre Channel, Ethernet, Infiniband, and Converged Network Adapters (CNA).

The SRIOV adapter has an I/O adapter virtualization architecture that allows a single I/O adapter to be concurrently shared across many different logical partitions. The sharing is done at a physical level, so that each logical partition has access to a slice of the physical adapter. The sharing is accomplished via partitioning the adapter into many different PCI functions, and then distributing access to those functions. The adapter is presented as one or more physical functions (PFs) that control functions, for example used for both configuration and I/O, and a set of virtual functions (VFs), used for I/O and limited configuration, each VF represents a slice of the adapter capacity that can be assigned to a logical partition independently of other VFs. Each logical partition has a device driver for each of the VFs assigned to the logical partition.

There is a requirement to periodically update the adapter driver, for example, either to add new function or to fix logic bugs. A VF device driver is limited in scope to a single VF, and can be more easily updated. The PF device or adapter driver is associated with the entire adapter, and updates are more difficult as a result. A significant part of the problem is the fact that the adapter driver configures the adapter itself, and will potentially need to reinitialize the adapter.

One approach is to schedule a maintenance window and take the entire adapter temporarily off-line to perform the updates. This approach is highly disruptive, and can be difficult to achieve as there may be dozens of logical partitions associated with the adapter.

Another approach is to have a second backup I/O channel to be used while the maintenance occurs. During the adapter driver update, I/O is switched to the backup channel. This is expensive, because it requires duplicates of the I/O resources.

A need exists for an effective mechanism to enable concurrent device driver maintenance and recovery for a Single Root Input/Output Virtualization (SRIOV) adapter in a virtualized system. It is desirable that such mechanism enables access to the adapter to be maintained during the update.

SUMMARY OF THE INVENTION

Principal aspects of the present invention are to provide a method, system and computer program product for implementing concurrent adapter driver maintenance and recovery for a Single Root Input/Output Virtualization (SRIOV) adapter. Other important aspects of the present invention are to provide such method, system and computer program product substantially without negative effects and that overcome many of the disadvantages of prior art arrangements.

In brief, a method, system and computer program product are provided for implementing concurrent adapter driver maintenance and recovery for a Single Root Input/Output Virtualization (SRIOV) adapter in a computer system. An adapter driver at start up time performs configuration of the adapter and each of a set of virtual functions (VFs). The adapter driver writes critical adapter and VF configuration data to a scratchpad buffer. When device driver maintenance is needed, such as to load updated adapter driver firmware or to fix logic bugs, all VF drivers are held off temporarily, the current adapter driver is detached, and then the adapter driver is reloaded with the updated driver firmware. Then the adapter driver is restarted with the updated adapter driver firmware, and performs a reinitialization process. The adapter driver performs adapter and VF configuration restoring existing configuration using values read from the scratchpad buffer.

In accordance with features of the invention, it is not required to provide a scheduled maintenance window with the adapter off-line to perform the updates. The VFs remain configured throughout the concurrent device driver maintenance and recovery process.

In accordance with features of the invention, the VF drivers need no special support with available error recovery processes used. All I/O remains intact, and there is only a brief pause during the reinitialization process. No backup I/O or failover needs to take place.

In accordance with features of the invention, a system hypervisor manages physical functions (PFs) associated with the SRIOV adapter. The existing configuration is restored through the use of the scratchpad buffer held in the hypervisor that is read by the adapter driver during its reinitialization process.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing concurrent adapter driver maintenance and recovery for a Single Root Input/Output Virtualization (SRIOV) adapter in a computer system.

Figure 1:
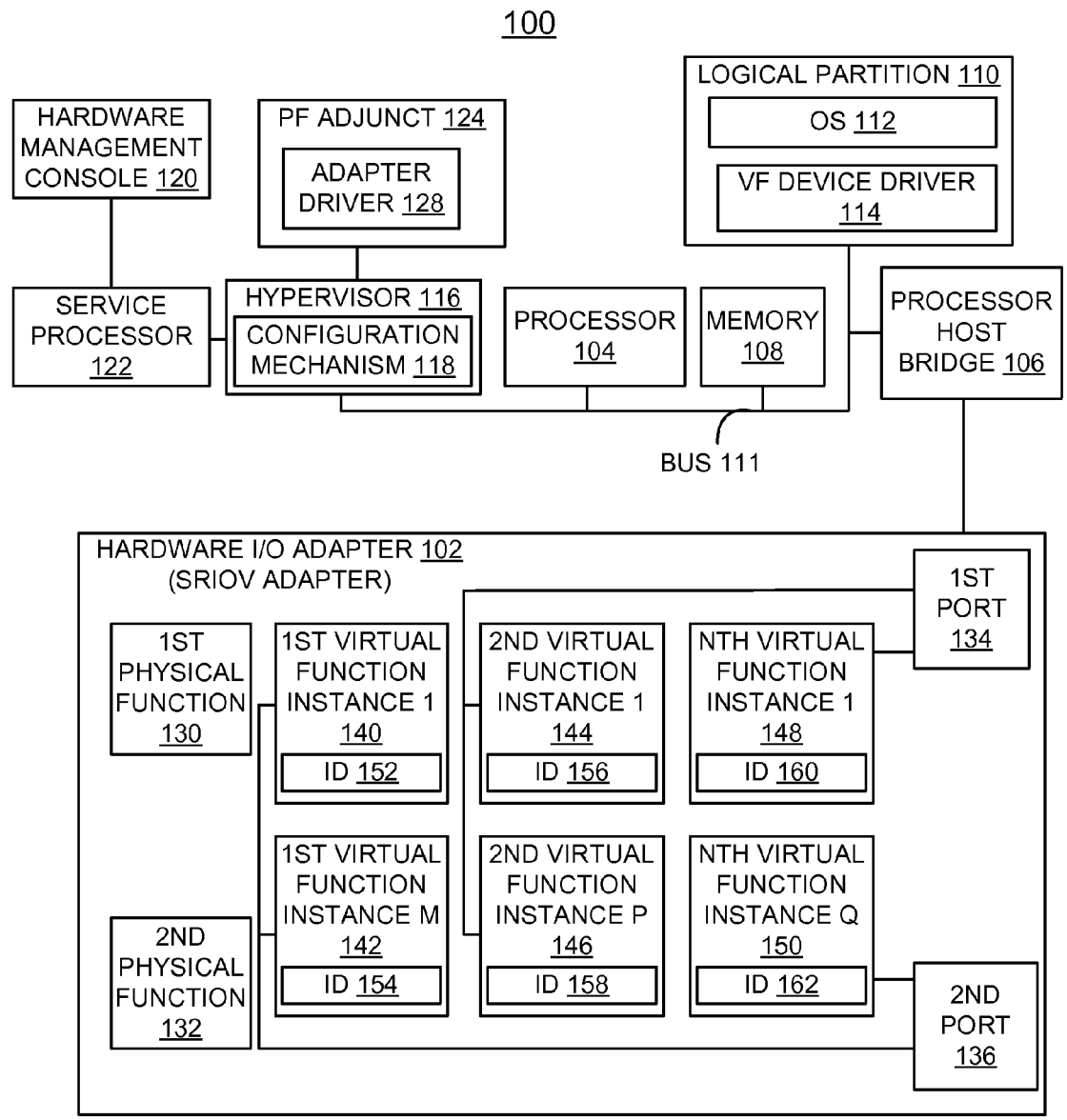
FIGS. 1, and 2 illustrates a respective example computer system and example system for implementing concurrent adapter driver maintenance and recovery for a Single Root Input/Output Virtualization (SRIOV) adapter in accordance with the preferred embodiment.

Having reference now to the drawings, in FIG. 1, there is shown an example computer system generally designated by the reference character 100 for implementing concurrent adapter driver maintenance and recovery for a Single Root Input/Output Virtualization (SRIOV) adapter 102 in accordance with the preferred embodiment. Computer system 100 includes one or more processors 104, or central processor units (CPUs) 104 (one shown) coupled by an I/O hub or processor host bridge 106 to the Single Root Input/Output Virtualization (SRIOV) adapter or hardware I/O adapter 102.

Computer system 100 includes a memory 108 and one or more logical partitions (LPARs) 110 (one shown) coupled by a system bus 111 to the processor 104 and the processor host bridge 106. Each operating system (OS) 112 resides in its own LPAR 110, with each LPAR allocated a part of a physical processor 104, an entire physical processor, or multiple physical processors from the computer 100. A VF device driver 114 is provided with the logical partition (LPAR) 110. A portion of the memory 108 is allocated to each LPAR 110. Computer system 100 includes a hypervisor 116 including a configuration mechanism 118. The hypervisor 116 is a part of the system firmware and manages the allocation of resources to each operating system 112 and LPAR 110.

As shown, a hardware management console (HMC) 120 used, for example, to manage system functions including logical partition configuration and hardware virtualization, is coupled to the hypervisor 116 via a service processor 122. Computer system 100 includes a physical function (PF) manager or PF adjunct 124 provided with the hypervisor 116. The PF adjunct 124 includes an adapter driver 128 to manage physical functions of the hardware I/O adapter 102. The hypervisor 116 uses the PF adjunct 124, for example, to configure physical functions (PFs) and virtual functions (VFs) of the hardware I/O adapter 102 based on configuration information provided by a system administrator via the hardware management console 120.

As shown, the hardware I/O adapter 102 includes, for example, a first physical function 130, a second physical function 132, a first port 134, and a second port 136. The hypervisor 116 using the PF adjunct 124 configures virtual functions based on the physical functions 130, 132 and associates virtual functions with one or more of the ports 134, 136 of the hardware I/O adapter 102.

For example, a first virtual function, 140, instance 1, and the Mth instance of the first virtual function 142, where M is greater than 1, are associated with the second port 136. As shown, a second virtual function 144, such as the first instance of the second virtual function 144 and the Pth instance of the second virtual function 146, where P is greater than 1, are associated with the first port 134. As shown, multiple instances of an Nth virtual function, where N is greater than 2, such as the first instance of the Nth virtual function 148 is associated with the first port 134 and the Qth instance of the Nth virtual function 150, where Q is greater than 1, is associated with the second port 136.

Each instance of the first virtual function 140, 142, the second virtual function 144, 146, and Nth virtual function 148, 150 are hosted by a physical function, such as one of the first physical function 132, the second physical function 132, and another physical function (not shown).

Each instance of the first virtual function 140, 142, the second virtual function 144, 146, and Nth virtual function 148, 150 includes a respective virtual function identifier (ID), shown as ID 152, ID 154, ID 156, ID 158, ID 160, and ID 162. Each virtual function identifier uniquely identifies a particular virtual function that is hosted by the hardware I/O adapter 102. For example, when a message (not shown) is routed to a particular virtual function, the message includes the identifier associated with the particular virtual function.

Computer system 100 is shown in simplified form sufficient for understanding the present invention. The illustrated computer system 100 is not intended to imply architectural or functional limitations. The present invention can be used with various hardware implementations and systems and various other internal hardware devices.

Figure 2:
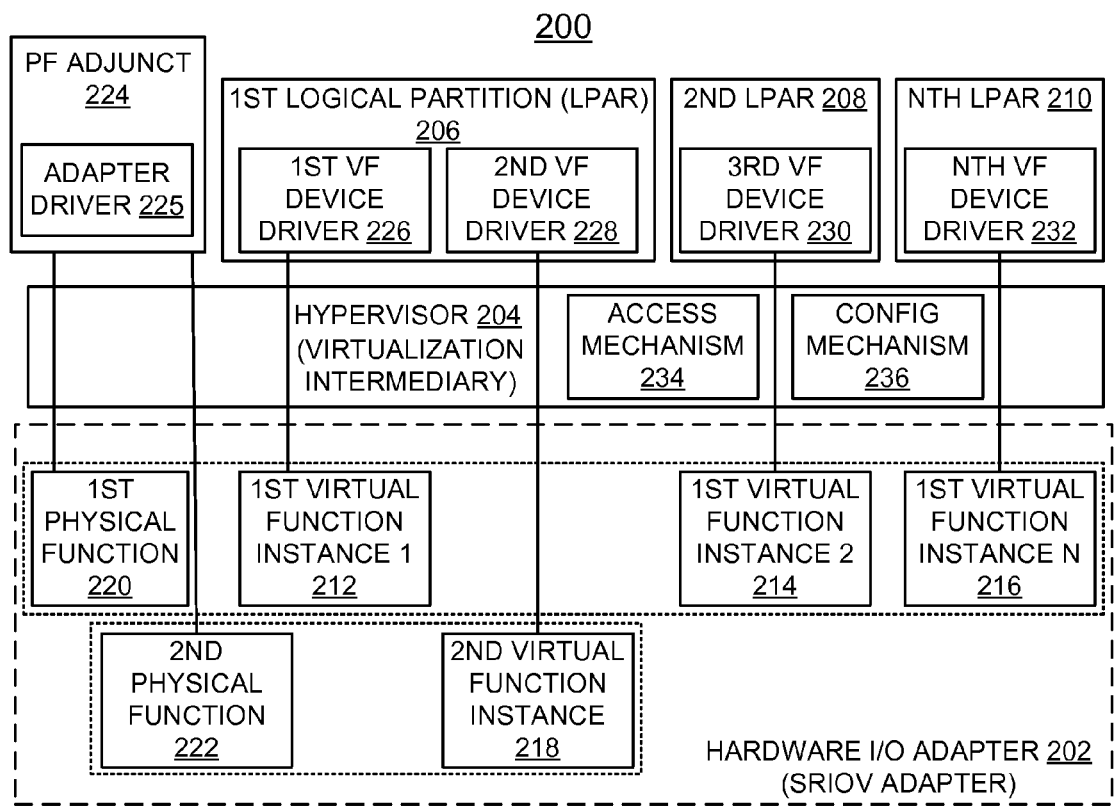

Referring to FIG. 2, there is shown another example system generally designated by the reference character 200 for implementing concurrent device driver maintenance and recovery for a hardware I/O adapter or Single Root Input/Output Virtualization (SRIOV) adapter or hardware I/O adapter 202 in accordance with the preferred embodiment.

System 200 includes a hypervisor 204 or other virtualization intermediary, used to enable multiple logical partitions to access virtual functions provided by hardware that includes the hardware I/O adapter 202. For example, as shown in FIG. 2, the hypervisor 204 is used to enable a first logical partition 206, a second logical partition 208, and an Nth logical partition 210, to access a plurality of virtual functions 212, 214, 216, 218 that are provided by the hardware I/O adapter 202. For example, the hypervisor 204 used a first physical function 220 of the hardware I/O adapter 202 to provide a first instance of a first virtual function 212, a second instance of a first virtual function 214, and an Nth instance of a first virtual function 216 to the logical partitions 204, 206, 210. As shown the hypervisor 204 uses a second physical function 222 of the hardware I/O adapter 202 to provide a second virtual function 218 to the logical partitions 206, 208, 210.

The physical functions 220, 222 advantageously include PCI functions, supporting single root I/O virtualization capabilities. Each of the virtual functions 212, 214, 216, 218 is associated with one of the physical functions 220, 222 and adapted to share one or more physical resources of the hardware I/O adapter 202.

Software functions or modules, such as a physical function (PF) adjunct 224 including an adapter driver 225, is provided with the hypervisor 204 for managing the physical functions 220, 222 and the virtual functions 212, 214, 216, 218. For example, a user may specify a particular configuration and the hypervisor 204 uses the PF adjunct 224 to configure the virtual functions 212, 214, 216, 218 from the physical functions 220, 222.

For example, in operation, the hypervisor 204 with the PF adjunct 224 enables the first virtual function instances 212, 214, 216 from the first physical function 220. The hypervisor 204 with the PF adjunct 224 enables the second virtual function 218 from the second physical function 222. The virtual functions 212, 214, 216, 218 are enabled, for example, based on a user provided configuration. Each of the logical partitions 206, 208, 210 may execute an operating system (not shown) and client applications (not shown).

As shown, the client applications that execute at the logical partitions 206, 208, 210 perform virtual input/output operations and include a respective device driver to directly manage an associated virtual function. For example, a first client application executing at the first logical partition 206 may include a first client VF device driver 226, and a second client application executing at the first logical partition 206 may include a second client VF device driver 228.

As shown, the first client VF device driver 226 accesses the first instance of the first virtual function 212. The second client virtual VF device driver 228 accesses the second virtual function 218. A third client VF device driver 230 executing at the second logical partition 208 accesses the second instance of the first virtual function 214. An Nth client VF device driver 232 executing at the Nth logical partition 210 accesses the Nth instance of the first virtual function 216. An access mechanism 234 and a configuration mechanism 236 are provided with the hypervisor 204 to associate a logical partition with an accessed virtual function. The hypervisor 304 uses the access mechanism 234 to enable logical partitions, such as LPAR 206 to access configuration space associated with one or more of the virtual functions 212, 214, 216, 218.

System 200 is shown in simplified form sufficient for understanding the present invention. The illustrated system 200 is not intended to imply architectural or functional limitations. The present invention can be used with various hardware implementations and systems and various other internal hardware devices.

In accordance with features of the invention, critical configuration data in a scratchpad buffer kept in the hypervisor is read during the adapter driver restart. This critical hardware configuration data is defined as any configuration data in addition to adapter capability and protocol settings provided by the customer, which is generated when configuring the adapter and its VFs that are necessary to reconfigure the adapter and those VFs identically after resetting the adapter. This may include, but is not limited to the VF MMIO memory map, number of VFs configured per physical function, map of logical VF indexes to virtual functions on the adapter, and DMA window assignments for configured VFs. Note that these resources include both adapter resources and also platform resources.

In accordance with features of the invention, this scratchpad buffer or scratchpad area is necessarily preserved during an adapter driver restart. However, it is necessary for the scratchpad buffer to be cleared at appropriate times. The scratchpad initial state is zeroed, indicating no configuration data is present for a clean or fresh adapter driver start. This is the scratchpad state at system power on, for example. However, actions where the physical adapter changes, such as a concurrent replacement of an adapter, result in the scratchpad area being cleared. This allows the adapter driver to have a clean start with the new hardware I/O adapter or adapter card. For example, this is necessary to handle cases where the physical adapter characteristics may have changed, such as from replacing an Ethernet adapter with a fiber channel adapter. Thus the data is preserved through adapter driver restarts, allowing maintenance of the adapter driver, while being cleared for a new adapter allowing a clean install to start fresh. This scratchpad area is completely managed within the hypervisor, requiring no external management, such as through the HMC or other channels.

Figure 3:
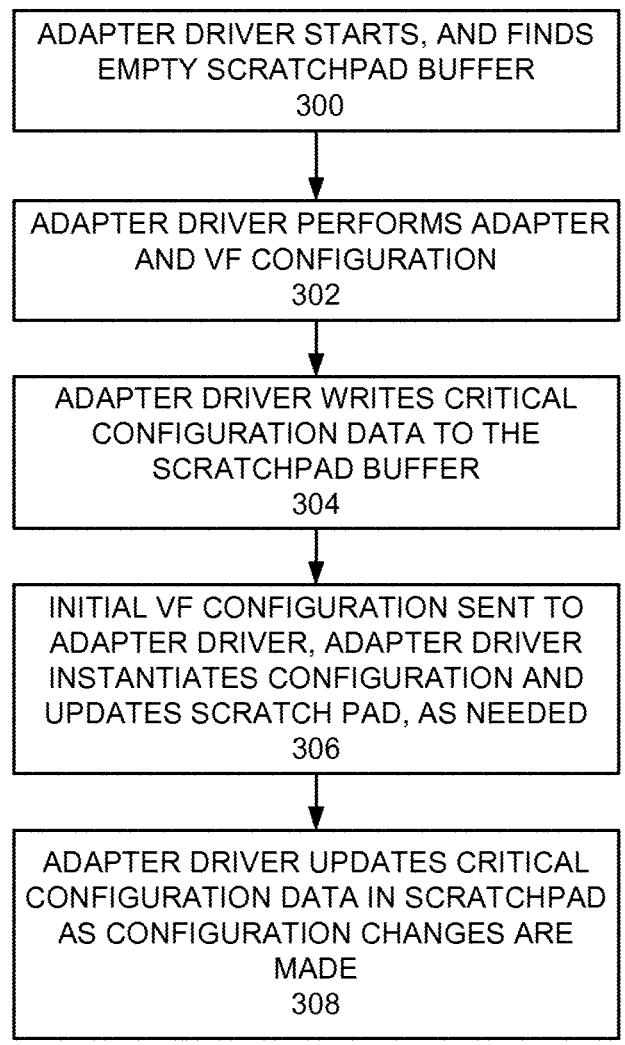
FIGS. 3, and 4 together provide a flow chart illustrating exemplary operations for implementing concurrent device driver maintenance and recovery for the SRIOV adapter in accordance with the preferred embodiment.
Figure 4:
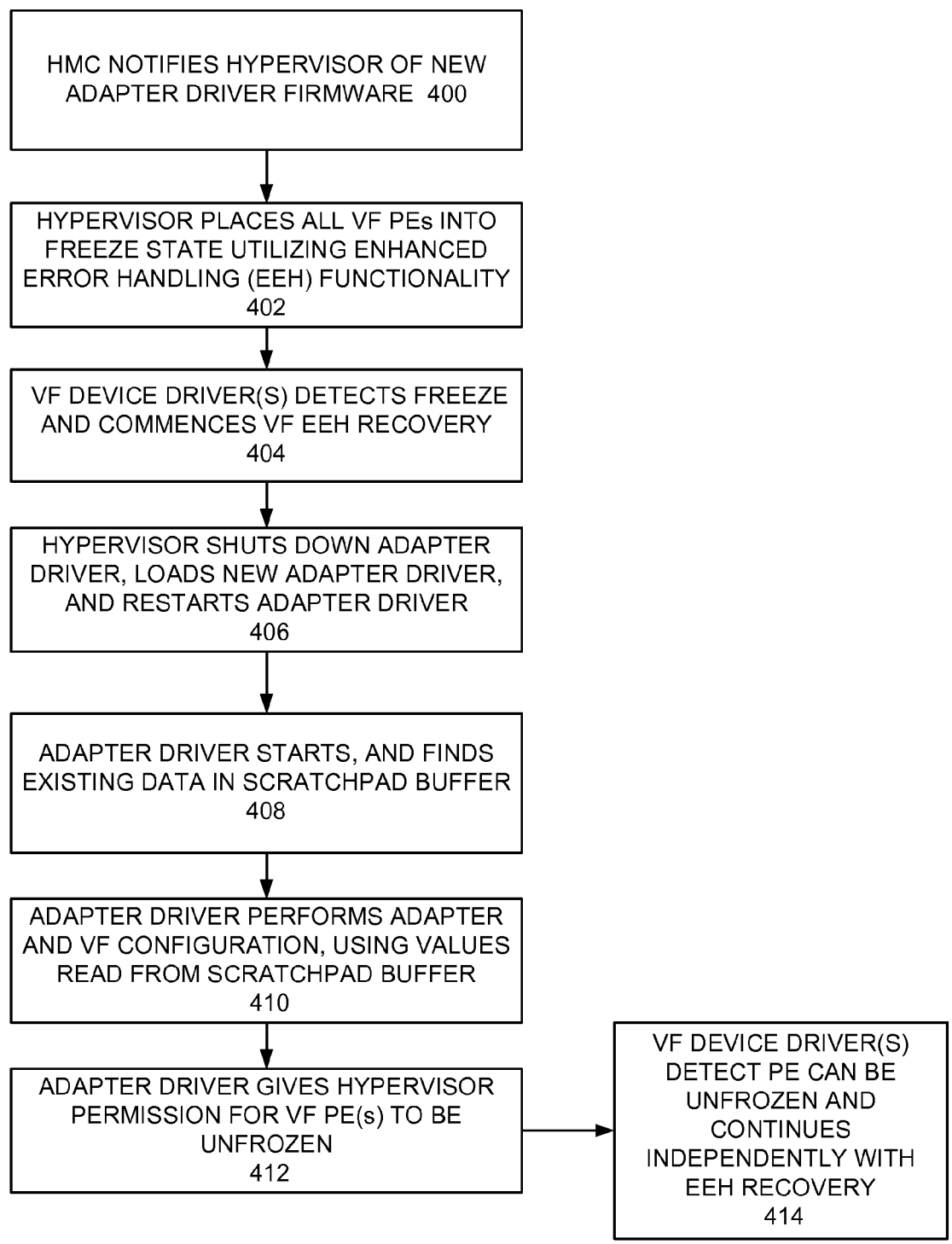

Referring to FIGS. 3 and 4, there are shown exemplary operations of the processing and logic provided by the hypervisor 130 for implementing concurrent device or adapter driver maintenance and recovery in accordance with the preferred embodiment.

In FIG. 3, as indicated in a block 300, the adapter driver starts and finds an empty scratchpad buffer. The adapter driver performs configuration of the adapter and configuration of the VFs as indicated in a block 302. The adapter driver writes critical configuration data to the scratchpad buffer as indicated in a block 304. Then the initial VF configuration is sent to the adapter driver, the adapter driver instantiates configuration and updates the configuration data in the scratchpad buffer as needed as indicated in a block 306. The adapter driver updates the critical configuration data in the scratchpad buffer as configuration changes are made as indicated in a block 308.

In FIG. 4, as indicated in a block 400, the hardware management console (HMC) notifies the hypervisor of new adapter driver firmware. The hypervisor places all VF Partitionable Endpoints (PEs) in a freeze state utilizing an enhanced error handling (EEH) functionality, as indicated in a block 402.

A Partitionable Endpoint (PE) is a separately assignable I/O unit. That is, any part of an I/O subsystem that can be assigned a logical partition independent of another PE. Each PE has independent domains (addressing, error, state, and the like) to provide PE level error isolation, detection, and recovery.

As indicated in a block 404, the VF device drivers or each VF device driver detects an error condition responsive to the freeze state of the PEs and commences a VF enhanced error handling (EEH) recovery. As indicated in a block 406, the hypervisor shuts down the adapter driver, loads a new adapter driver; then the hypervisor restarts the adapter driver. The adapter driver starts, and finds existing critical hardware configuration data for the adapter and VFs in the scratchpad buffer as indicated in a block 408. As indicated in a block 410, the adapter driver uses the existing configuration data from scratchpad buffer to reconfigure adapter and VFs identically as in step 302 in FIG. 3. The adapter driver gives the hypervisor permission for the VF PEs to be unfrozen (as also performed in an EEH of a Shared Adapter process) as indicated in a block 412. The VF drivers commence recovery independently (as also performed in an EEH of a Shared Adapter process) as indicated in a block 414.

Figure 5:
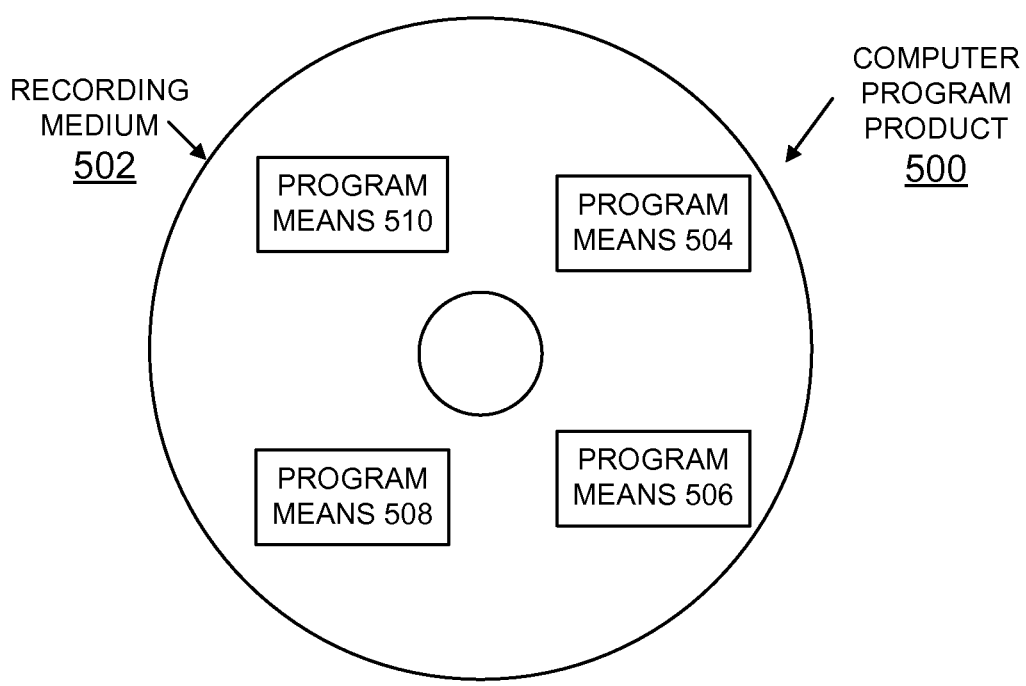
FIG. 5 is a block diagram illustrating a computer program product in accordance with the preferred embodiment.

Referring now to FIG. 5, an article of manufacture or a computer program product 500 of the invention is illustrated. The computer program product 500 is tangibly embodied on a non-transitory computer readable storage medium that includes a recording medium 502, such as, a floppy disk, a high capacity read only memory in the form of an optically read compact disk or CD-ROM, a tape, or another similar computer program product. Recording medium 502 stores program means 504, 506, 508, and 510 on the medium 502 for carrying out the methods for implementing concurrent device driver maintenance and recovery for a Single Root Input/Output Virtualization (SRIOV) adapter of a preferred embodiment in the system 100 of FIG. 1.

A sequence of program instructions or a logical assembly of one or more interrelated modules defined by the recorded program means 505, 506, 508, and 510, direct the computer system 500 for implementing concurrent device driver maintenance and recovery for a Single Root Input/Output Virtualization (SRIOV) adapter of a preferred embodiment.

While the present invention has been described with reference to the details of the embodiments of the invention shown in the drawing, these details are not intended to limit the scope of the invention as claimed in the appended claims.

What is claimed is:

1. A method for implementing concurrent device driver maintenance and recovery for a Single Root Input/Output Virtualization (SRIOV) adapter in a computer system comprising:

providing a physical function (PF) adjunct including an adapter driver with a hypervisor for managing physical functions and virtual functions of the Single Root Input/Output Virtualization (SRIOV) adapter; each virtual function being associated with a physical function, and the physical function supporting SRIOV capabilities;

performing an initialization process including said adapter driver performing adapter and virtual function (VF) configuration, and said adapter driver writing adapter and virtual function (VF) configuration data to a scratchpad buffer, said scratchpad buffer kept in said hypervisor and said scratchpad buffer being completely managed within said hypervisor without requiring external management;

responsive to configuration changes being made, said adapter driver updating configuration data in the scratchpad buffer;

responsive to adapter driver maintenance being needed, said hypervisor placing each VF driver in a freeze state, said hypervisor detaching a current adapter driver, and said hypervisor reloading the adapter driver with an updated adapter driver firmware;

said hypervisor restarting the adapter driver with the updated adapter driver firmware, and said adapter driver performing a reinitialization process including said adapter driver restoring adapter and virtual function (VF) configuration using configuration data values read from the scratchpad buffer; and said hypervisor preserving the configuration data in the scratchpad buffer during adapter driver restart for implementing concurrent device driver maintenance and recovery for the Single Root Input/Output Virtualization (SRIOV) adapter.

2. The method as recited in claim 1, wherein the initialization process includes starting an adapter driver and the adapter driver finding an empty scratchpad buffer.

3. The method as recited in claim 1, wherein placing each VF driver in a freeze state includes placing all VF Partitionable Endpoints (PEs) in the freeze state.

4. The method as recited in claim 1, includes the VF driver detecting an error condition responsive to being placed in the freeze state.

5. The method as recited in claim 4, further includes the VF driver commencing an error handling recovery.

6. The method as recited in claim 5, wherein performing a reinitialization process includes the adapter driver giving a system hypervisor permission for all VF Partitionable Endpoints (PEs) to be unfrozen.

7. The method as recited in claim 6, includes said VF driver detecting permission for all VF Partitionable Endpoints (PEs) to be unfrozen, and continuing the error handling recovery.

8. The method as recited in claim 1, wherein writing adapter and virtual function (VF) configuration data to a scratchpad buffer includes storing the adapter and virtual function (VF) configuration data in persistent data.

9. The method as recited in claim 1, includes a hardware management console (HMC) notifying a system hypervisor of the updated adapter driver firmware being available.

10. The method as recited in claim 1, includes using a system hypervisor, managing the scratchpad buffer within the system hypervisor.

11. The method as recited in claim 10, wherein detaching a current adapter driver, and reloading the adapter driver with an updated adapter driver firmware includes restarting the adapter driver responsive to loading the updated adapter driver firmware, and finding configuration data values from the scratchpad buffer.

12. A system for implementing concurrent device driver maintenance and recovery for a Single Root Input/Output Virtualization (SRIOV) adapter in a computer system comprising:

a processor;

providing a physical function (PF) adjunct including an adapter driver with a hypervisor for managing physical functions and virtual functions of the Single Root Input/Output Virtualization (SRIOV) adapter; each virtual function being associated with a physical function, and the physical function supporting SRIOV capabilities;

said hypervisor managing functions associated with the SRIOV adapter;

said processor using said hypervisor and said adapter driver to perform the steps of:

performing an initialization process including said adapter driver performing adapter and virtual function (VF) configuration, and said adapter driver writing adapter and virtual function (VF) configuration data to a scratchpad buffer; said scratchpad buffer kept in said hypervisor and said scratchpad buffer being completely managed within said hypervisor without requiring external management;

responsive to configuration changes being made, said adapter driver updating configuration data in the scratchpad buffer;

responsive to adapter driver maintenance being needed, said hypervisor placing each VF driver in a freeze state, said hypervisor detaching a current adapter driver, and said hypervisor reloading the adapter driver with an updated adapter driver firmware;

said hypervisor restarting the adapter driver with the updated adapter driver firmware, said adapter driver performing a reinitialization process including restoring adapter and virtual function (VF) configuration using configuration data values read from the scratchpad buffer; and said hypervisor preserving the configuration data in the scratchpad buffer during adapter driver restart for implementing concurrent device driver maintenance and recovery for the Single Root Input/Output Virtualization (SRIOV) adapter.

13. The system as recited in claim 12, wherein the initialization process includes starting an adapter driver and the adapter driver finding an empty scratchpad buffer.

14. The system as recited in claim 12, wherein placing each VF driver in a freeze state includes placing all VF Partitionable Endpoints (PEs) in the freeze state.

15. The system as recited in claim 12, includes the VF driver detecting an error condition responsive to being placed in the freeze state.

16. The system as recited in claim 15, further includes the VF driver commencing an error handling recovery.

17. The system as recited in claim 12, wherein performing a reinitialization process includes the adapter driver giving a system hypervisor permission for all VF Partitionable Endpoints (PEs) to be unfrozen.

18. The system as recited in claim 17, includes said VF driver detecting permission for all VF Partitionable Endpoints (PEs) to be unfrozen, and continuing the error handling recovery.

19. The system as recited in claim 12, includes said hypervisor completely managing the scratchpad buffer within said hypervisor.

20. The system as recited in claim 12, includes a hardware management console (HMC) notifying a system hypervisor of the updated adapter driver firmware being available.

* * * * *